US006366610B1

(12) United States Patent
Loyer et al.

(10) Patent No.: US 6,366,610 B1
(45) Date of Patent: Apr. 2, 2002

(54) AUTOBAUDING WITH ADJUSTMENT TO A PROGRAMMABLE BAUD RATE

(75) Inventors: Bruce A. Loyer, Austin; Melanie D. Typaldos, Buda, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/080,336

(22) Filed: May 15, 1998

(51) Int. Cl.[7] .............................................. H04B 17/00
(52) U.S. Cl. ..................... 375/225; 375/354; 713/600
(58) Field of Search ................................ 375/225, 340, 375/354, 355, 356, 357; 713/400, 500, 502, 503, 600

(56) References Cited

U.S. PATENT DOCUMENTS

| | | | |
|---|---|---|---|
| 3,747,074 A | 7/1973 | Schulze | 340/172.5 |
| 4,003,032 A | 1/1977 | Austin et al. | 340/172.5 |
| 5,095,498 A * | 3/1992 | DeLuca et al. | 375/340 |
| 5,222,081 A | 6/1993 | Lewis et al. | 375/117 |
| 5,490,209 A | 2/1996 | Kennedy et al. | 379/97 |
| 5,627,858 A * | 5/1997 | Mak et al. | 375/225 |
| 5,631,952 A | 5/1997 | O'Barr et al. | 379/93 |
| 5,657,347 A | 8/1997 | Mori | 375/225 |
| 5,724,389 A * | 3/1998 | Marko et al. | 375/225 |

FOREIGN PATENT DOCUMENTS

GB 2324688 * 10/1998 .......... H04L/25/02

OTHER PUBLICATIONS

*International Search Report*, PCT/US99/06423, Jul. 19, 1999, 3 pp.
Am9513A/Am9513 System Timing Controller Technical Manual, Chapter 6, "Frequency Baud Rate Generation," © 1990 Advanced Micro Devices, pp. 6–1 through 6–9.
*Élan™SC400 and ÉlanSC410 Micrcontrollers User's Manual*, © 1997 Advanced Micro Devices, Inc., pp. 15–1 through 15–8.
*Product Brief MC68360 Q Uad Integrated Communication Controller* (QUICC™), Motorola, 1993, pp. 1–2.
*MC68360 Quad Integrated Communications Controller User's Manual*, Motorola, pp. 7–1, 7–103–106.
AM186™ED/EDLV, High Performance, 80C186–and 80C188–Compatible, 16–Bit Embedded Microcontrollers, Advanced Micro Devices, Inc., May 1997, pp. 1–2, 47–48.
*Am186™ES and Am188™ES User's Manual*, ©1997 Advanced Micro Devices, Inc., pp. 10–1 through 10–14.

\* cited by examiner

Primary Examiner—Stephen Chin
Assistant Examiner—Chieh M. Fan
(74) Attorney, Agent, or Firm—Akin, Gump, Strauss, Hauer & Feld LLP (57) ABSTRACT

An asynchronous receiver/transmitter provides autobauding with adjustment to a programmable baud rate. A baud divisor is calculated based on a detected size of a start bit. The asynchronous receiver/transmitter provides a plurality of baud divisor replacement registers, each register storing a baud divisor threshold and a baud divisor replacement. The baud divisor is compared to the plurality of programmed baud divisor thresholds. Based on the performed hardware comparison, the baud divisor is automatically replaced by a baud divisor replacement for a particular baud divisor range defined by a baud divisor threshold and including the baud divisor. The baud rate corresponding to this baud divisor replacement represents the appropriate baud rate. Autobauding with adjustment to a programmed baud rate corrects for measurement inaccuracies with respect to the start bit size. Autobauding with adjustment to a programmed baud rate also permits an asynchronous receiver/transmitter to reliably support high speed baud rates. Further, the programmable nature of the baud divisor thresholds and baud divisor replacements permits an asynchronous receiver/transmitter to support autubauding at multiple asynchronous receiver/transmitter frequencies.

33 Claims, 6 Drawing Sheets

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | BAUD_DIVISOR_REPLACEMENT-1 | | | | | | | | | BAUD_DIVISOR_THRESHOLD-1 | | | | | |

202a

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | BAUD_DIVISOR_REPLACEMENT-2 | | | | | | | | | BAUD_DIVISOR_THRESHOLD-2 | | | | | |

202b

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | BAUD_DIVISOR_REPLACEMENT-3 | | | | | | | | | BAUD_DIVISOR_THRESHOLD-3 | | | | | |

202c

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | BAUD_DIVISOR_REPLACEMENT-4 | | | | | | | | | BAUD_DIVISOR_THRESHOLD-4 | | | | | |

202d

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | | | | | | | | AUB | | | | | | | |

208

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | BAUD DIV | | | | | | | | | | | | | | | |

| HSUART FREQUENCY (PROCESSOR FREQUENCY OR UCLK FREQUENCY) | | | | | | |
|---|---|---|---|---|---|---|
| | 24MHz | 25MHz | 40MHz | 44.2MHz | 48MHz | 50MHz |
| BAUD RATE | DIVISOR | DIVISOR | DIVISOR | DIVISOR | DIVISOR | DIVISOR |
| 300 | 5000 | 5208 | 8333 | 9208 | 10000 | 10417 |
| 600 | 2500 | 2604 | 4167 | 4604 | 5000 | 5208 |
| 1200 | 1250 | 1302 | 2083 | 2302 | 2500 | 2604 |
| 2400 | 625 | 651 | 1042 | 1151 | 1250 | 1302 |
| 9600 | 156 | 163 | 260 | 288 | 313 | 326 |
| 19200 | 78 | 81 | 130 | 144 | 156 | 163 |
| 38400 | 39 | 41 | 65 | 72 | 78 | 81 |
| 57600 | 26 | 27 | 43 | 48 | 52 | 54 |
| 115200 | 13 | 14 | 22 | 24 | 26 | 27 |
| 230400 | 7 | 7 | 11 | 12 | 13 | 14 |
| 460800 | 3 | 3 | 5 | 6 | 7 | 7 |

AUTOBAUDING WITH ADJUSTMENT TO A PROGRAMMABLE BAUD RATE

BACKGROUND OF THE INVENTION

1. Field of the Invention

The present invention relates to automatic baud detection by asynchronous receiver/transmitters and more particularly, to automatic baud detection with adjustment to a programmable baud rate.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may support a wide range of communication applications.

A typical feature of a microcontroller has been a universal asynchronous receiver/transmitter (UART) for providing asynchronous serial communication. Since communication applications (e.g. Integrated Systems Digital Network (ISDN) applications) frequently employ high data transfer rates for asynchronous serial communication, asynchronous serial ports are of particular importance to communications microcontrollers.

Certain communications microcontrollers, such as the MC68360 available from Motorola, Inc., have utilized automatic baud detection (also known as autobauding) in determining a baud rate for data to and from asynchronous serial ports. A baud rate is the rate at which data is sent and received over an asynchronous serial link by a microcontroller. The baud rate must be predetermined or determined through autobauding and independently controlled on both the sending and receiving ends. The standard baud rates in the industry have included 1200, 2400, 4800, 9600, 19.2K, 28.8K, 33.3K, 54K, and 115K data transfer rates. Asynchronous serial communication is commonly used for transferring data to and from memory, or across a bridge from one data bus or device to another. When data is transferred from one bus or device to another, synchronization can be very difficult. Accurately determining a baud rate is therefore important to ensuring successful transmission and reception of data by a microcontroller.

In autobauding, a baud rate has commonly been determined automatically from the length or size of a start bit of a data or character stream. A baud rate is typically produced by a baud rate generator. Autobauding has typically been performed by a UART. For a baud rate generator of a UART, a low level on a receive data line frequently designated RXD typically corresponds to the beginning of the start bit. When a low level or high to low transition on the receive data line is detected, the UART begins counting the start bit length. The UART terminates the counting in response to a low to high transition. An input clock to the baud generator should generally be as fast as possible to improve the accuracy of the start bit measurement.

A start bit of a data stream has been susceptible to line distortions and noise. If a noise pulse or line distortion "hits" the start bit, the length of the start bit has become shorter or longer. The altered size of the start bit, which constitutes a sampling error, is then used to determine a baud divisor. As is understood in the art, a baud rate is a function of the baud divisor. For a UART, a clock is typically divided by the baud divisor and multiplied by a certain factor to obtain the baud rate. The baud rate calculated from the determined baud divisor has been determined incorrectly because the baud divisor is based on an incorrect size of the start bit. For example, the baud divisor derived from a shorter start bit length is smaller than a baud divisor based on the pre-noise start bit length. The baud rate calculated from the smaller baud divisor is higher than a baud divisor based on the pre-noise start bit length. Autobauding thus may be subject to significant inaccuracies when an incoming data stream is distorted.

Line distortions and noise have particularly been a concern at high baud rates where line distortions and noise are significant. In addition, at high baud rates, the finite frequency of the input clock of the baud rate generator produces more significant inaccuracies. Because of these concerns, asynchronous receiver/transmitters using autobauding have avoided high baud rates so as to maintain acceptable ranges of accuracy and reliability.

SUMMARY OF THE INVENTION

Briefly, the present invention provides an asynchronous receiver/transmitter and method for autobauding with adjustment to a programmable baud rate. When autobauding is enabled, the asynchronous receiver/transmitter detects the size of a start bit. A baud divisor is calculated based on the start bit size and stored in a baud divisor register. The asynchronous receiver/transmitter provides a plurality of baud divisor replacement registers, each register storing a baud divisor threshold and a baud divisor replacement. The baud divisor replacement may be set to baud divisors for standard or non-standard baud rates. The baud divisor is compared to the plurality of programmed baud divisor thresholds. Based on the performed hardware comparison, the baud divisor is automatically replaced by a baud divisor replacement for a particular baud divisor range defined by a baud divisor threshold(s) and including the baud divisor. The baud divisor replacement takes place immediately following the start bit and before the next byte of data is received. The baud rate corresponding to this baud divisor replacement represents the appropriate baud rate. The hardware comparison and replacement operations are controlled by a baud divisor controller.

In accordance with the present invention, automatic adjustment to a programmed baud rate compensates for any alteration of a start bit size by line distortion or noise. As a result, autobauding is performed with improved accuracy and reliability. Further, an asynchronous receiver/transmitter utilizing this compensation mechanism, may achieve considerable accuracy even at high baud rates.

DETAILED DESCRIPTION OF PREFERRED EMBODIMENT

Figure 1A:
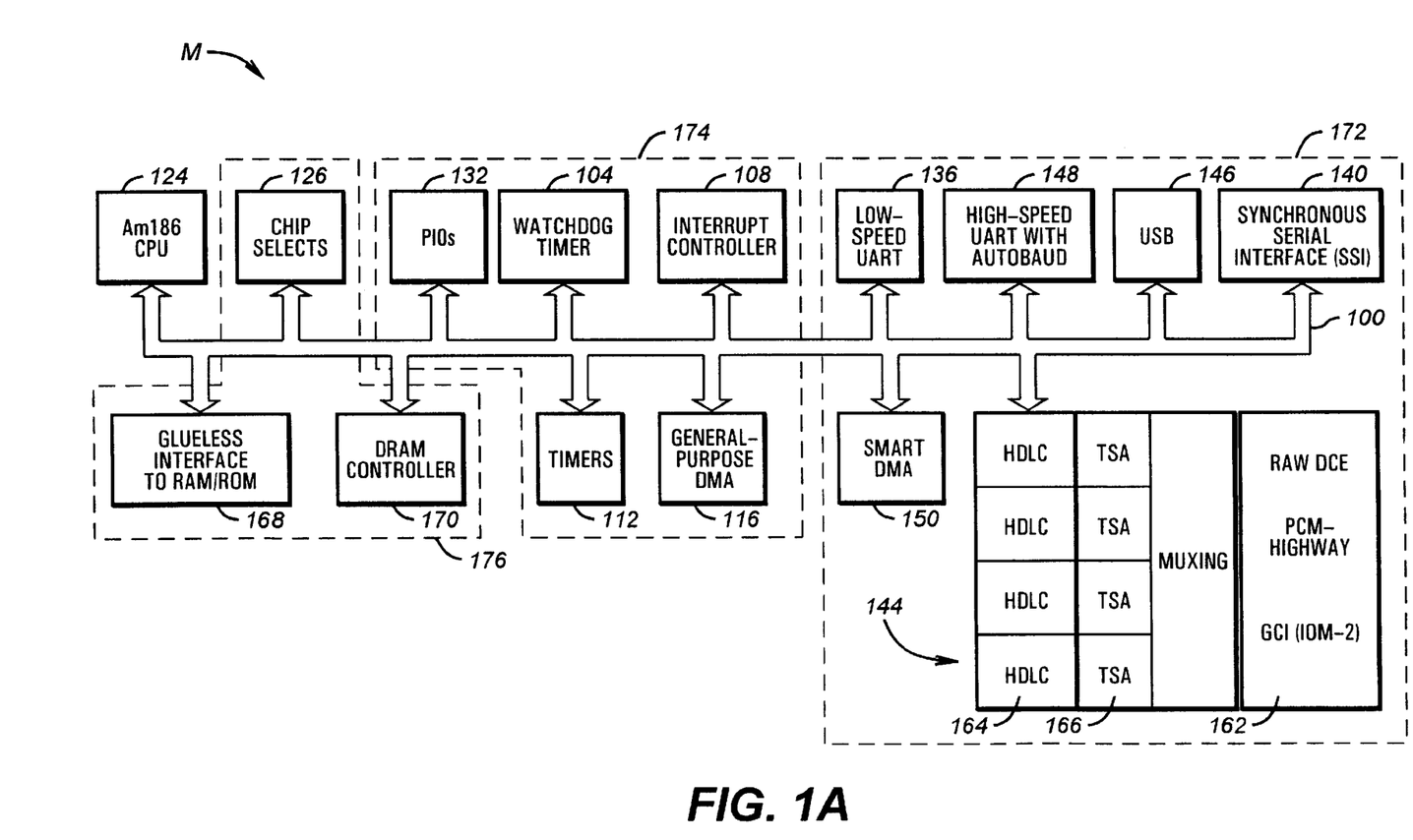
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176 and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. The microcontroller M further supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. In the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the 205 microcontroller M acts as a master in the synchronous serial interface 140, which is a standard synchronous serial channel.

The microcontroller M in the disclosed embodiment is particularly well suited to communications environments. To this end, the serial communication peripherals 172 of the micorcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. In accordance with the present invention, the HSUART 148 performs automatic baud detection with adjustment to a programmable baud rate as discussed below. It should be understood that the microcontroller M may include multiple HSUARTs 148. While a microcontroller is one potential device for providing an asynchronous receiver/transmitter in accordance with the present invention, an asynchronous receiver/transmitter may alternatively be provided independently or in connection with other devices. The nature of the particular device used in connection with an asynchronous receiver/transmitter is not critical to the present invention.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 1B:
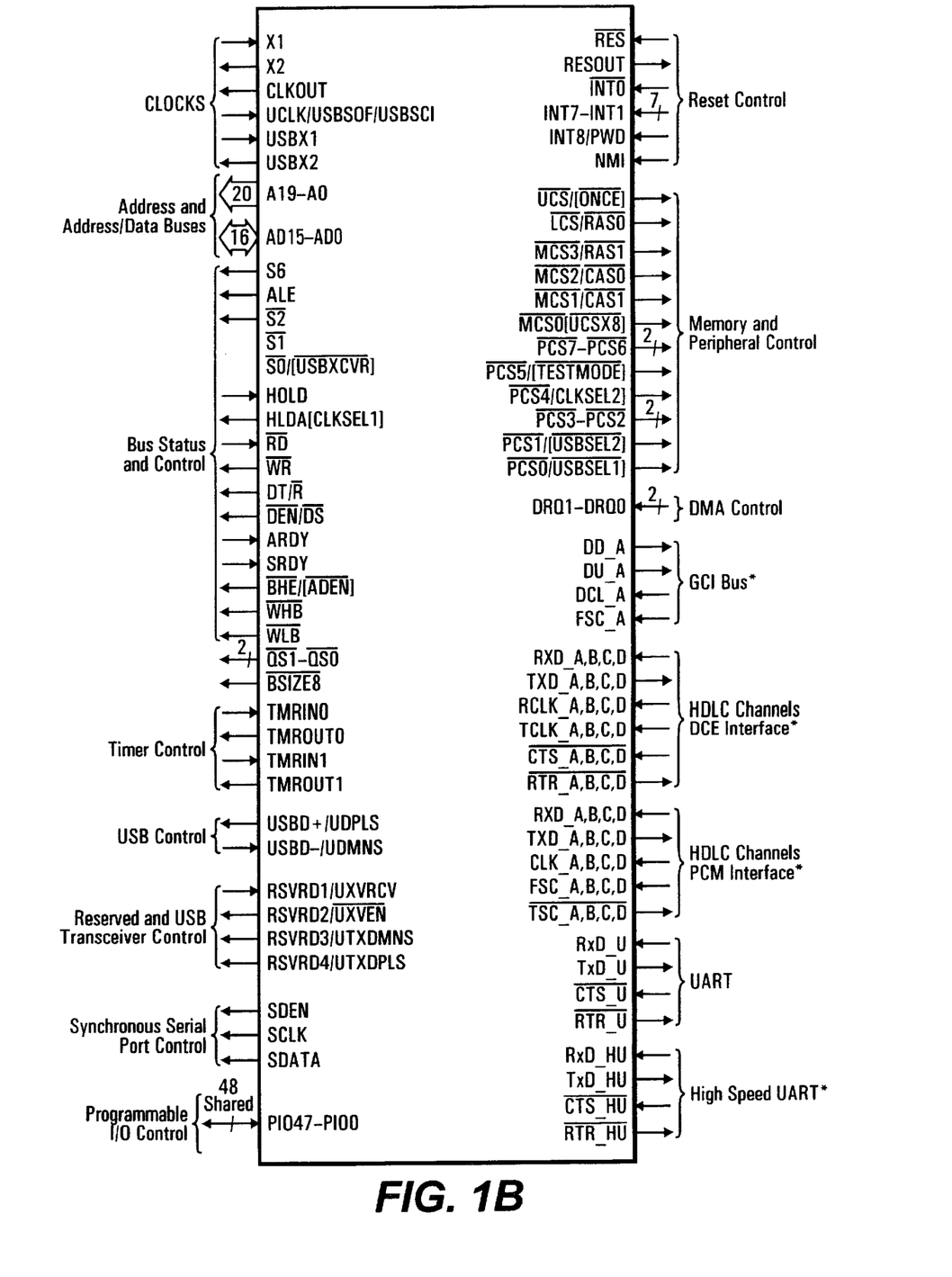
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

The techniques and circuitry according to the invention could be applied to a wide variety of microcontrollers. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
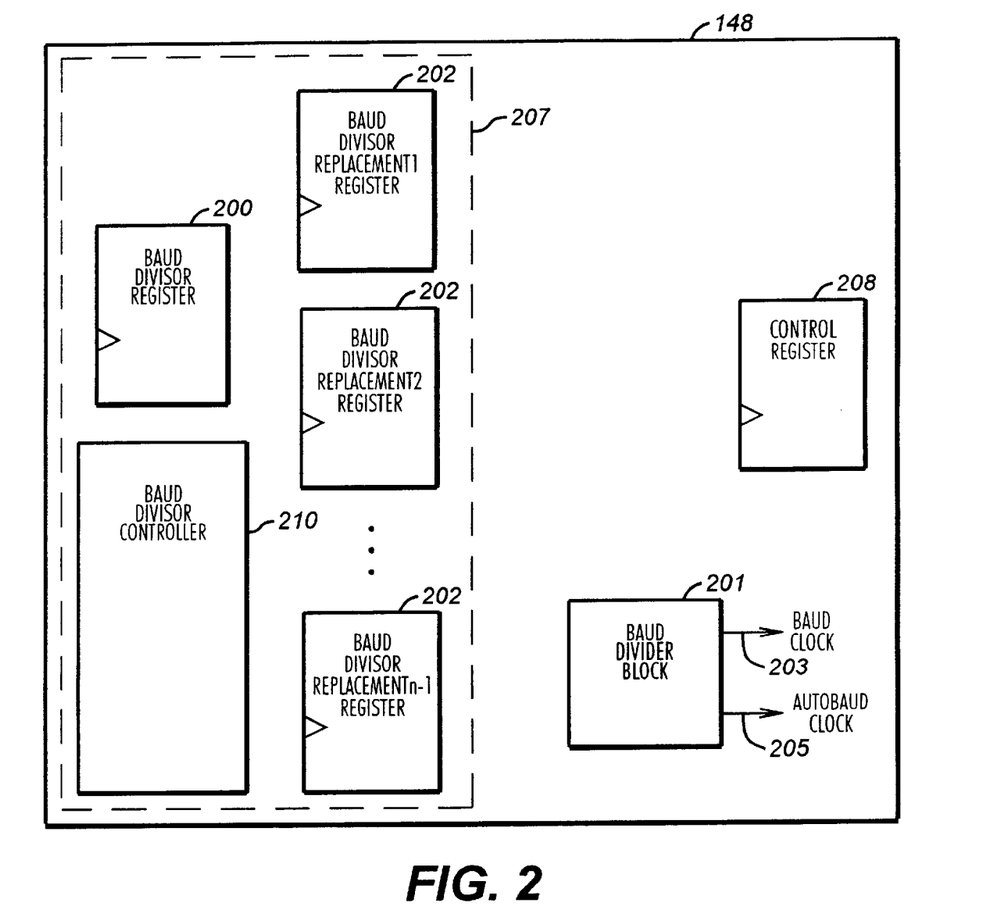
FIG. 2 is a block diagram of logic within the high speed universal asynchronous receiver/transmitter (HSUART) of FIG. 1A for determining a baud rate for the HSUART in accordance with the present invention.

Referring to FIG. 2, a block diagram of logic within the HSUART 148 for determining a baud rate is shown. A baud divisor register 200 is used for storing a baud divisor. As is understood in the art, a baud rate is determined based on the baud rate divisor. The general formula for describing the relationship between a baud rate divisor (BAUD DIV) and a baud rate is:

BAUD DIV=HSUART frequency/(16·baud rate)).

The precise nature of the formula for calculating a baud divisor based on a desired baud rate is not critical to the present invention. A baud divider block 201 (FIG. 3) is provided for generating a baud clock 203 and an autobaud clock 205. Details concerning one implementation of the baud divider block 201 are provided below.

Certain asychronous receiver/transmitters have provided an autobaud clock for use in automatically detecting a baud rate. These asychronous reciever/transmitters have typically been placed in an autobaud mode by writing a particular value to an autobaud mode bit of a control register. A conventional asynchronous receiver/transmitter for performing autobauding typically generates an autobaud clock based on a baud divisor value stored in a baud divisor register. A baud divisor value stored in a baud divisor register has been based on the size of a start bit of a data stream received over a receive data line of the asynchronous receiver/transmitter. A start bit of a data stream, however, has been susceptible to line distortions and noise. As an example, line distortion affects the start bit, the length of the start bit has become shorter. This alteration of the size of the start bit necessarily results in an incorrect baud divisor being stored to a baud divisor register. As described below, the present invention compensates for start bit size inaccuracies by providing an asynchronous receiver/transmitter and method for autobauding with adjustment to a programmable baud rate.

A plurality of baud divisor replacement registers 202 are provided within the HSUART 148 in accordance with the present invention. Details concerning the plurality of baud divisor replacement registers 202 are discussed below. The HSUART 148 also provides a baud divisor controller 210 (FIG. 5) that is discussed below. Additionally, the HSUART 148 includes a control register 208 for use in enabling an autobaud mode of the HSUART 148. It will be appreciated by those in the art that the HSUART 148 may further include conventional asynchronous serial port registers. These registers, for example, may include a status register, a receive register, a transmit register, and an interrupt control register.

Figure 3:
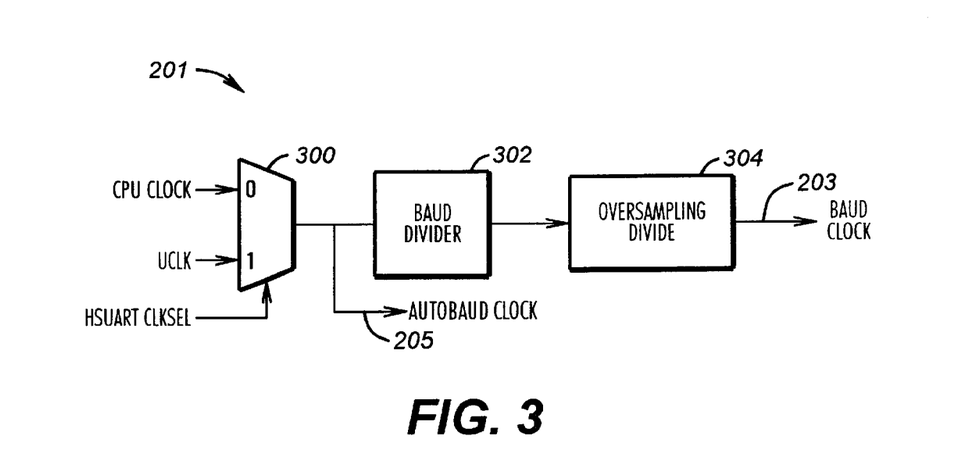
FIG. 3 is an exemplary functional diagram of a baud divider block of the HSUART of FIG. 2 in accordance with the present invention.

Referring to FIG. 3, an exemplary functional diagram of the baud divider block 201 is shown. In the disclosed embodiment, a selector or multiplexor stage 300 for receiving two input clock signals, CPU CLOCK and UCLK, is provided. The selector stage 300 further receives a select signal HSUART CLKSEL for selecting one of the two possible clock sources. The output signal of the selector stage 300 constitutes the autobaud clock 205. For further processing of the output signal to generate the baud clock 203, the output signal is provided to a baud divider stage 302. In the baud divider stage 302, the particular clock source provided by the selector stage 300 is divided by the baud divisor value stored in the baud divisor register 200. Next, at an oversampling divide stage 304, the clock signal is divided by a particular factor to account for oversampling. The resulting clock signal constitutes the baud clock 203. It will be appreciated by those in the art that a variety of implementations other than the described implementation may be used for generating an autobaud clock and a baud clock.

Figure 4:
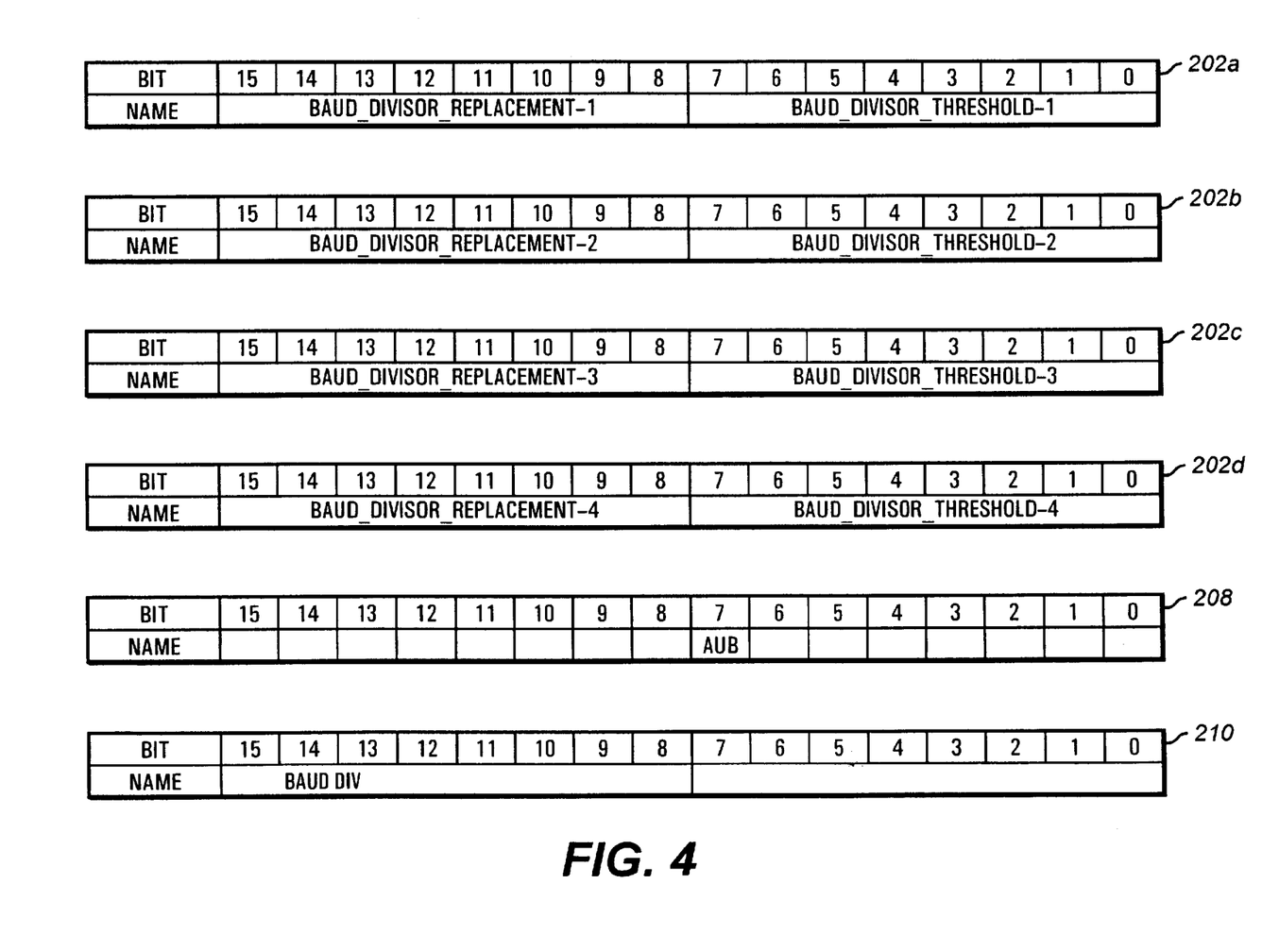
FIG. 4 shows the baud divisor replacement registers, the HSUART control register, and the baud divisor register of FIG. 3 in accordance with the present invention.

Referring to FIG. 4, a plurality of baud divisor replacement registers 202, the HSUART control register 208, and the baud divisor register 200 are shown. In the disclosed embodiment, a baud divisor replacement-1 register 202a, a baud divisor replacement-2 register 202b, a baud divisor replacement-3 register 202c, and a baud divisor replacement-4 register 202d are provided. It should be understood that the present invention may provide any number of baud divisor replacement registers 202. Each baud divisor replacement register includes 16 bits in which the lower-order byte (bits[7:0]) represents a baud divisor threshold field and the higher-order byte (bits[15:8]) represent a baud divisor replacement field. It should be understood that a baud divisor replacement register may include any number of bits (e.g. 8). A baud divisor replacement field serves to store a baud divisor replacement, and a baud divisor threshold field serves to store a baud divisor threshold. The baud divisor replacements and the baud divisor thresholds are utilized in determining a baud rate in accordance with the present invention as described below. The baud divisor register 200 is readable and writable by hardware. The plurality of baud divisor replacement registers 202 are readable by hardware. It will be appreciated by those skilled in the art that the field size and bit locations for the baud divisor field and a baud divisor threshold field may be varied.

FIG. 4 also includes an illustration of the control register 208 and the baud divisor register 200. In accordance with the present invention, a particular bit of the control register 208 is designated as an autobaud mode bit (AUB). The autobaud mode bit is used for enabling and disabling the autobaud mode. In the disclosed embodiment, the autobaud mode bit AUB is illustratively shown as bit 7. In the disclosed embodiment, both the control register 208 and the baud divisor register 200 are 16-bit registers. The two bytes within the baud divisor register 200 together define a baud divisor field for storing a baud divisor BAUD DIV. The use of the baud divisor field in determining a baud rate in accordance with the present invention is described below.

Figure 5:
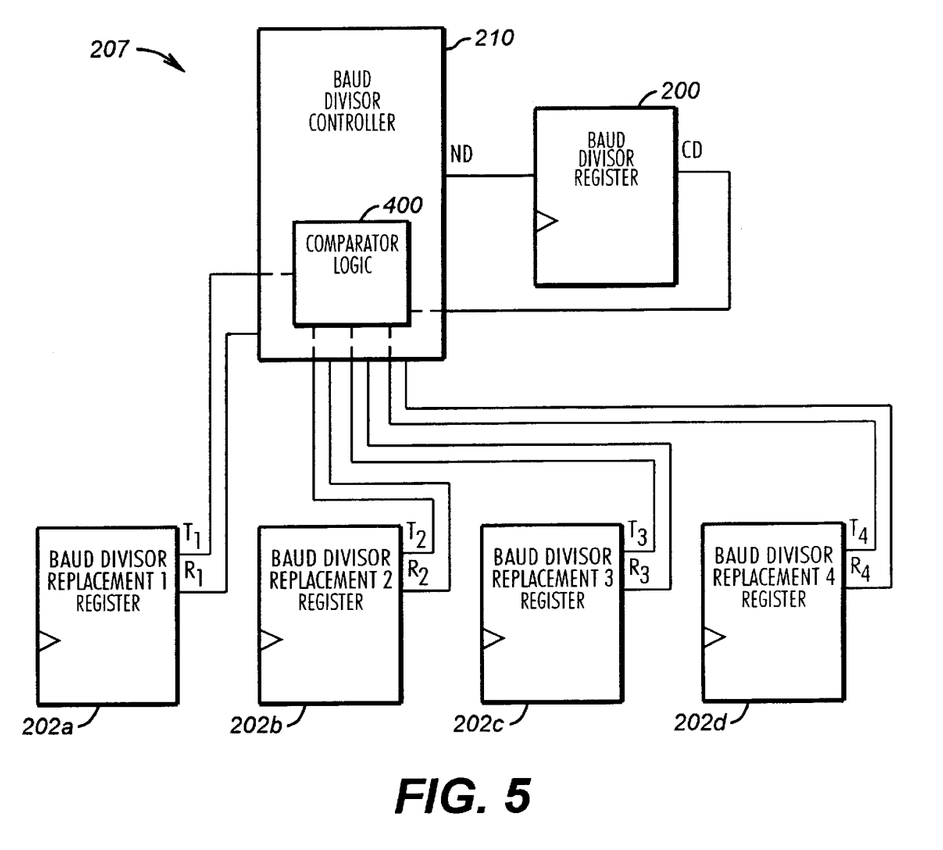
FIG. 5 is a schematic diagram of baud divisor logic including the baud divisor replacement registers and baud divisor register of FIG. 4 and a baud divisor controller in accordance with the present invention.

Referring to FIG. 5, a schematic diagram of baud divisor logic 207 (FIG. 2) including a baud divisor controller 210, the baud divisor register 200, and baud divisor replacement registers 202 is shown. The baud divisor controller 210 includes comparator logic 400 for comparing the contents of the baud divisor field of the baud divisor register 200 with the contents of a baud divisor threshold field of a baud divisor replacement register 202. Each baud divisor replacement register 202a, 202b, 202c, and 202d is coupled to a baud divisor threshold line $T_1$, $T_2$, $T_3$, and $T_4$ for providing a baud divisor threshold value stored in a baud divisor threshold field to the comparator logic 400. The baud divisor register 200 is coupled to a current baud divisor line CD for providing the current baud divisor value stored in the baud divisor field to the comparator logic 400.

Each baud divisor replacement register 202a, 202b, 202c, and 202d is coupled to a baud divisor replacement line $R_1$, $R_2$, $R_3$, and $R_4$, for providing a baud divisor replacement value stored in a baud divisor replacement field to the baud divisor controller 210. The baud divisor controller 210 is configured to provide a new baud divisor line ND to the baud divisor register 200 for setting the baud divisor BAUD DIV to a baud divisor replacement value.

Figure 6:
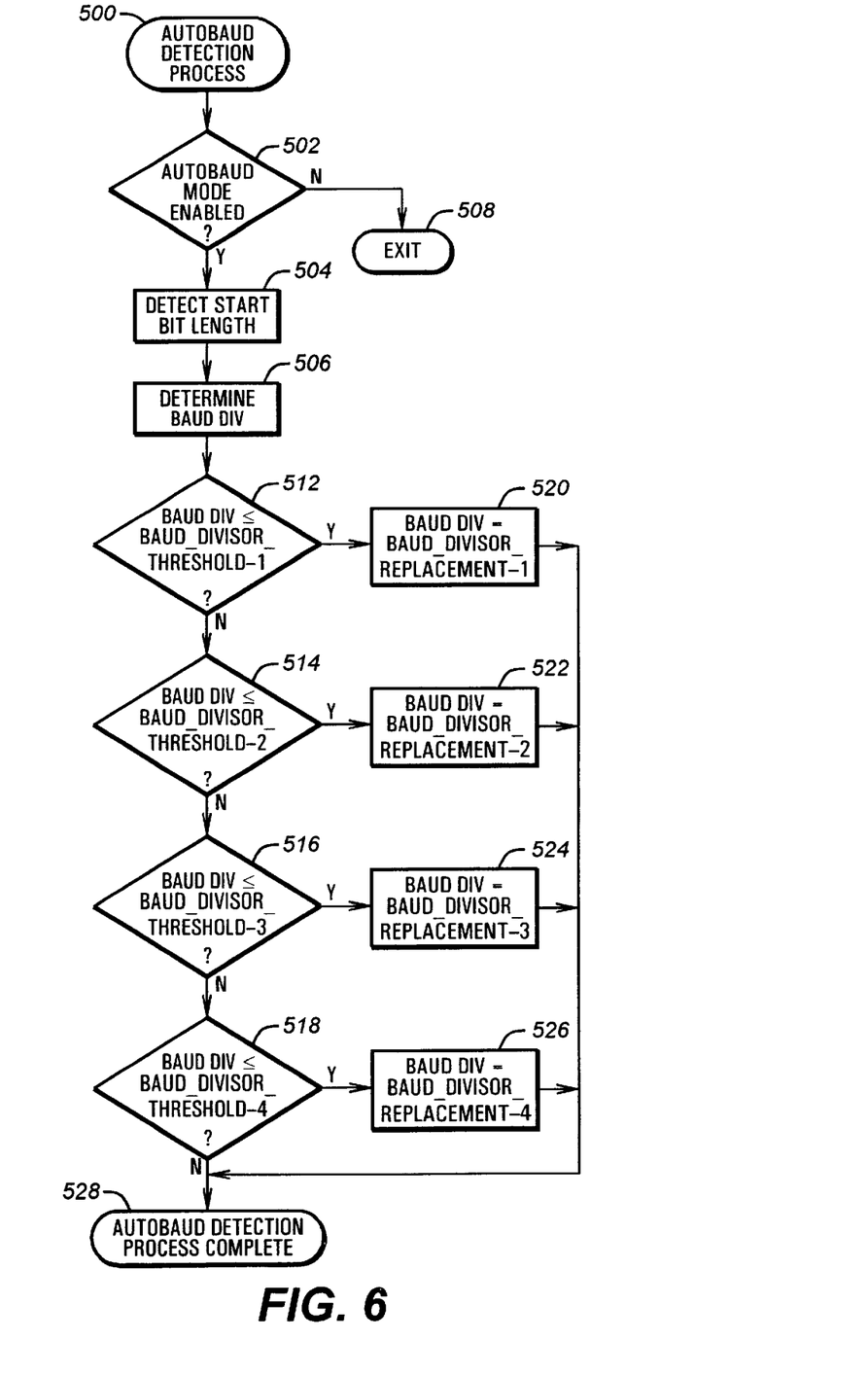
FIG. 6 is a flow chart of an autobaud detection process performed by the HSUART of FIG. 1A and FIG. 2 in accordance with the present invention.

Referring to FIG. 6, a flow chart of an autobaud detection process 500 in accordance with the present invention is shown. Prior to initiation of the autobaud detection process 500, each baud divisor replacement register 202a, 202b, 202c, and 202d is programmed with a particular baud divisor threshold and a particular baud divisor replacement. The programmed baud divisor replacement may correspond to a standard or non-standard baud rate. A baud divisor value for achieving a particular baud rate is a function of the frequency for a baud clock. By providing programmable baud divisor replacements and baud divisor thresholds, the microcontroller M may support autobauding for multiple clock frequencies. Programmability permits software to adjust for different HSUART frequencies, different baud rates, clock rate differences, line distortions, and other parameters that are system dependent.

In the disclosed embodiment, a baud divisor replacement BAUD DIVISOR_REPLACEMENT-1 and a baud divisor threshold BAUD DIVISOR_THRESHOLD-1 are stored in the baud divisor replacement-1 register 202a. A baud divisor replacement BAUD_DIVISOR_REPLACEMENT-2 and a baud divisor threshold BAUD_DIVISOR_THRESHOLD-2 are stored in the baud divisor replacement-2 register 202b. A baud divisor replacement BAUD_DIVISOR_REPLACEMENT-3 and a baud divisor threshold BAUD_DIVISOR_THRESHHOLD-3 are stored in the baud divisor replacement-3 register 202c. A baud divisor replacement BAUD_DIVISOR_REPLACEMENT-4 and a baud divisor threshold BAUD_DIVISOR_THRESHOLD-4 are stored in the baud divider replacement register 202d.

Beginning in step 502, it is determined whether an autobaud mode is enabled. This determination is made by detecting the state of the autobaud mode bit AUB in the control register 208. If the value of the AUB bit indicates that the autobaud mode is disabled, then control exits through step 508. If instead the value of the AUB bit indicates that the autobaud mode is enabled, then control proceeds to step 504 where the length or size of the start bit is detected. Next, in step 506, a baud divisor value BAUD DIV is determined and stored in the baud divisor field. The general formula for this determination is provided above.

Next, in step 512, it is determined if the baud divisor BAUD DIV is less than or equal to the baud divisor threshold BAUD_DIVISOR_THRESHOLD-1. For this particular mathematical (e.g. logical) condition or relationship, the baud divisor thresholds may be ordered for comparison from the smallest baud divisor threshold to the largest baud divisor threshold. It should be understood that step 512 and other mathematical steps of the autobaud detection process may alternatively be performed through mathematical conditions other than a "less than or equal to" condition. For example, rather than determining if a baud divider BAUD DIV is "less than or equal to" a baud divisor threshold, it may be determined whether a baud divisor BAUD DIV is "greater than or equal to", "greater than", or "less than" a baud divisor threshold.

In step 512, if the baud divisor BAUD DIV is less than or equal to the baud divisor threshold BAUD_DIVISOR_THRESHOLD-1, then in step 520 the baud divisor BAUD DIV is set to the baud divisor replacement BAUD_DIVISOR_REPLACEMENT-1 corresponding to the compared baud divisor threshold BAUD_DIVISOR_THRESHOLD-1. This baud divisor replacement operation takes place immediately following the start bit and before the next byte of data is received. From step 520, control proceeds to step 528 where the autobaud detection process is complete. In step 512 if the baud divisor BAUD DIV is greater than the baud divisor threshold-1 BAUD_DIVISOR_THRESHOLD-1, then control proceeds from step 512 to step 514.

In step 514, it is determined if the baud divisor BAUD DIV is less than or equal to the baud divisor threshold BAUD_DIVISOR_THRESHOLD-2. If the baud divisor BAUD DIV is less than or equal to the baud divisor threshold BAUD_DIVISOR_THRESHOLD-2, then in step 522 the baud divisor BAUD DIV is set to the baud divisor replacement BAUD_DIVISOR_REPLACEMENT-2 corresponding to the compared baud divisor threshold BAUD_DIVISOR_THRESHOLD-2. From step 522, control proceeds to step 528 where the autobaud detection process is complete. If the baud divisor BAUD DIV is greater than the baud divisor threshold BAUD_DIVISOR_THRESHOLD-2, then control proceeds from step 514 to step 516.

In step 516, it is determined if the baud divisor BAUD DIV is less than or equal to the baud divisor threshold BAUD_DIVISOR_THRESHOLD-3. If the baud divisor BAUD DIV is less than or equal to the baud divisor threshold BAUD_DIVISOR_THRESHOLD-3, then in step 524 the baud divisor BAUD DIV is set to the baud divisor replacement BAUD_DIVISOR_REPLACEMENT-3 corresponding to the compared baud divisor threshold BAUD_DIVISOR_THRESHOLD-3. From step 524, control proceeds to step 528 where the autobaud detection process is complete. If the baud divisor BAUD DIV is greater than the baud divisor threshold BAUD_DIVISOR_THRESHOLD-3, then control proceeds from step 516 to step 518.

In step 518, it is determined if the baud divisor BAUD DIV is less than or equal to the baud divisor threshold BAUD_DIVISOR_THRESHOLD-4. If the baud divisor BAUD DIV is less than or equal to the baud divisor threshold BAUD_DIVISOR_THRESHOLD-4, then in step 526 the baud divisor BAUD DIV is set to the baud divisor replacement BAUD_DIVISOR_

REPLACEMENT-4 corresponding to the compared baud divisor threshold BAUD_DIVISOR_THRESHOLD-4. From step 526, control proceeds to step 528 where the autobaud detection process is complete. If the baud divisor BAUD DIV is greater than the baud divisor threshold BAUD_DIVISOR_THRESHOLD-4, then control proceeds from step 518 to step 528 where the autobaud detection process is completed. It should be understood that rather than comparing a baud divisor BAUD DIV to a single baud divider threshold, a baud divisor BAUD DIV alternatively be compared to multiple (e.g. dual) baud divider thresholds.

In the disclosed embodiment, certain steps of the autobaud detection process are controlled by the baud divisor controller 210. It will be appreciated by those skilled in the art that the baud divisor controller 210 may be implemented as a state machine. It should further be appreciated that the autobaud detection process could alternatively be represented as a state diagram. A flow chart, however, is believed to be the best representation for providing an understanding of the autobaud detection process of the present invention.

In accordance with the autobaud detection process of the present invention, a baud divisor is compared to each baud divisor threshold until a predetermined mathematical condition relating the baud divisor and the baud divisor threshold is met. Each baud divisor threshold(s) defines a baud divisor range of baud divisor value. By automatically resetting a baud divisor to a baud divisor replacement when a predetermined mathematical condition relating the baud divisor and the baud divisor threshold is met, a baud divisor is ensured to correspond to a specific baud rate (standard or non-standard) understood by other devices, as opposed to a baud rate offset by a particular variance (due to distortion) from the specific baud rate understood by other devices. In effect, the present invention decouples the determination of a baud rate using the size of a start bit from start bit size inaccuracies (sampling errors) typically attributable to distortion and noise.

Further, autobauding by conventional microcontrollers has been limited to baud rates in the range of 57 k. Noise and distortion have been a significant concern at high baud rates (i.e. baud rates greater than approximately 57 k). The present invention, by compensating for alteration of start bit size due to noise and distortion, permits a microcontroller to support high baud rates. Utilizing the present invention, Applicants have achieved baud rates greater than approximately 57 k.

Further, in accordance with the present invention, for each particular baud divisor range, a baud divisor threshold may be set higher than the baud divisor value expected as a result of distortion or noise. As a result of distortion or noise, a baud divisor value detected suggests a baud rate higher than would be suggested in the absence of distortion or noise. In accordance with the present invention, the baud divisor value detected as a result of the distortion or noise is automatically "on the fly" replaced by a baud divisor replacement value which suggests the appropriate baud rate.

For example, suppose two baud divisor thresholds of 10 and 21 and two baud divisor replacements of 7 and 14 are programmed. If a baud divisor is less than or equal to 10 (a "less than" condition being the exemplary mathematical condition), then the baud divisor is replaced by the baud divisor replacement value of 7. Next, if the baud divisor is not less than or equal to 10, then it is determined if the baud divisor is less than or equal to 21. If the baud divisor is less than or equal to 21, then the baud divisor is replaced by the baud divisor replacement value of 14. To minimize the likelihood of a baud divisor being replaced by an incorrect baud divisor replacement value, a baud divisor threshold is preferably set between the "next" baud divisor replacement values above and below the baud divisor threshold. As seen in this example, the baud divisor threshold of 10 is programmed roughly midway between the baud divisor replacement values of 7 and 14. It should be understood that a baud divisor threshold and a baud divisor are application specific.

Figure 7:
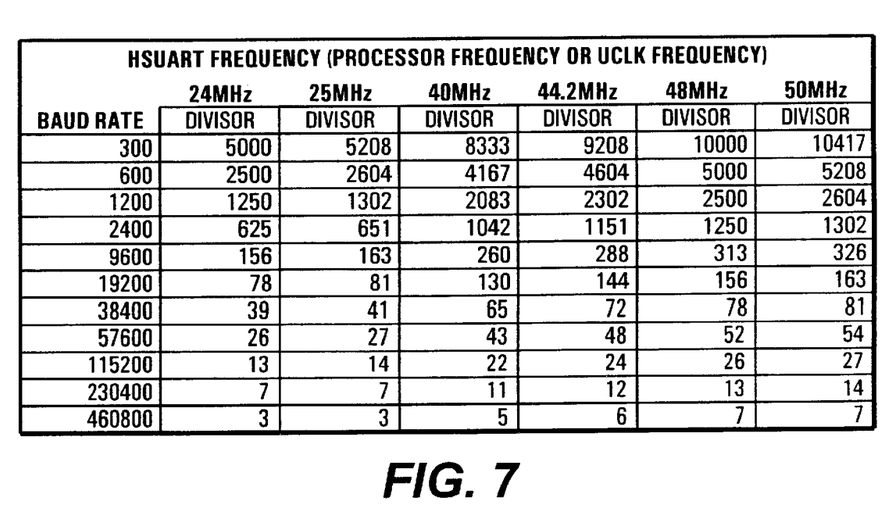
FIG. 7 is a table illustrating exemplary baud divisors and baud rates in accordance with the present invention.

Referring to FIG. 7, an exemplary table 700 of baud rates and baud divisors in accordance with the present invention is shown. The table 700 depicts the baud divisors for a set of baud rates over a set of clock frequencies achieved by the present invention. The illustrated baud rates include 300, 600, 1200, 2400, 9600, 19200, 38400, 57600, 115200, 230400, and 460800, and the illustrated clock frequencies include 24 MHz, 25 MHz, 40 MHz, 44.2 MHz, and 50 MHz. It should be understood that an asynchronous receiver/transmitter in accordance with the present invention may support non-standard clock frequencies and baud rates (integer and non-integer). The values in the baud divisor columns of the table specify the baud divisor values BAUD DIV. In accordance with the present invention, the baud divisor value BAUD DIV is equal to one of the baud divisor replacement values. It should be understood that the listed baud rates, baud divisors, and clock frequencies are illustrative and not exhaustive.

By autobauding with adjustment to a programmable baud rate in accordance with the present invention, autobauding is achieved at high baud rates. For example, the table 700 illustrates that baud rates up to approximately 460 k may be supported. It will be appreciated by those in the art that the present invention may extend to baud rates beyond 460 k.

The foregoing disclosure and description of the invention are illustrative and explanatory thereof, and various changes in the number of bits, number of signals, order of steps, field sizes, connections, components, and materials, as well as in the details of the illustrated hardware and construction and method of operation may be made without departing from the spirit of the invention.

We claim:

1. A method of automatic baud detection with adjustment to a programmable baud rate by an asynchronous receiver/transmitter, the asynchronous receiver/transmitter including a baud divisor register for storing a baud divisor and a plurality of baud divisor replacement registers for storing a plurality of baud divisor thresholds and a plurality of baud divisor replacements, the method comprising the steps of:
   determining the baud divisor, comprising the step of:
      detecting the size of a start bit of a data stream received by the asynchronous receiver/transmitter;
   comparing the baud divisor to the plurality of baud divisor thresholds; and
   selectively setting the baud divisor to a baud divisor replacement of a baud divisor replacement register of the plurality of baud divisor replacement registers storing a baud divisor threshold based on a comparison between the baud divisor and the baud divisor threshold.

2. The method of claim 1, the comparing step comprising the step of:

comparing the baud divisor to each baud divisor threshold of the plurality of baud divisor thresholds until a predetermined mathematical condition relating the baud divisor and the baud divisor threshold is met.

3. The method of claim 1, the comparing step comprising of the step of:

determining if a predetermined mathematical condition relating the baud divisor and the baud divisor threshold is met.

4. The method of claim 1, the selectively setting step comprising the step of:

setting the baud divisor to a baud divisor replacement of a baud divisor replacement register if a predetermined mathematical condition relating the baud divisor and the baud divisor threshold is met.

5. The method of claim 1, wherein the baud divisor replacement and the baud divisor threshold are programmable.

6. The method of claim 1, wherein the baud divisor replacement corresponds to a high speed baud rate.

7. The method of claim 1, wherein the baud divisor replacement corresponds to a baud rate greater than approximately 57 k.

8. The method of claim 1, wherein the selectively setting step occurs immediately following the start bit and before a next byte of data is received.

9. An asynchronous receiver/transmitter configured for automatic baud detection with adjustment to a programmable baud rate, comprising:

a baud divisor register for storing a baud divisor;

a plurality of baud divisor replacement registers for storing a plurality of baud divisor thresholds and a plurality of baud divisor replacements; and a baud divisor controller coupled to the plurality of baud divisor replacement registers and the baud divisor register for executing steps comprising:

determining the baud divisor, comprising the step of:

detecting the size of a start bit of a data stream received by the asynchronous receiver/transmitter;

comparing the baud divisor to the plurality of baud divisor thresholds; and selectively setting the baud divisor to a baud divisor replacement of a baud divisor replacement register of the plurality of baud divisor replacement registers storing a baud divisor threshold based on a comparison between the baud divisor and the baud divisor threshold.

10. The asynchronous receiver/transmitter of claim 9, the comparing step comprising the step of:

comparing the baud divisor to each baud divisor threshold of the plurality of baud divisor thresholds.

11. The asynchronous receiver/transmitter of claim 9, the comparing step comprising the step of:

comparing the baud divisor to each baud divisor threshold of the plurality of baud divisor thresholds until a predetermined mathematical condition relating the baud divisor and the baud divisor threshold is met.

12. The asynchronous receiver/transmitter of claim 9, the comparing step comprising of the step of:

determining if a predetermined mathematical condition relating the baud divisor and the baud divisor threshold is met.

13. The asynchronous receiver/transmitter of claim 9, wherein the plurality of baud thresholds and the plurality of baud divisor replacements are programmable.

14. The asynchronous receiver/transmitter of claim 9, the selectively setting step comprising the step of:

setting the baud divisor to a baud divisor replacement of a baud divisor replacement register if the baud divisor is less than or equal to a baud divisor threshold of the baud divisor replacement register.

15. The asynchronous receiver/transmitter of claim 9, wherein the baud divisor replacement corresponds to a high speed baud rate if a predetermined mathematical condition relating the baud divisor and the baud divisor threshold is met.

16. The asynchronous receiver/transmitter of claim 9, wherein the baud divisor replacement corresponds to a baud rate greater than approximately 57 k.

17. The asynchronous receiver/transmitter of claim 9, wherein the selectively setting step occurs immediately following the start bit and before a next byte of data is received.

18. The asynchronous receiver/transmitter of claim 9, further comprising:

an autobaud clock generated from the baud divisor replacement.

19. The asynchronous receiver/transmitter of claim 9, the asynchronous receiver/transmitter having an autobaud mode for automatic baud detection with adjustment to a programmable baud rate, further comprising:

an autobaud mode bit for enabling the autobaud mode of the asynchronous receiver/transmitter.

20. An asynchronous receiver/transmitter configured for automatic baud detection with adjustment to a programmable baud rate, comprising:

a means for storing a baud divisor;

a means for storing a plurality of baud divisor replacements;

a means for determining the baud divisor, comprising:

a means for detecting the size of a start bit of a data stream received by the asynchronous receiver/transmitter;

a means for comparing the baud divisor to a plurality of baud divisor thresholds; and a means for selectively setting the baud divisor to a baud divisor replacement of the plurality of baud divisor replacements based on a comparison between the baud divisor and the plurality of baud divisor thresholds.

21. The method of claim 1, wherein the baud divisor replacement corresponds to a standard baud rate.

22. The asynchronous receiver/transmitter of claim 9, wherein the baud divisor replacement corresponds to a standard baud rate.

23. A microcontroller, comprising:

an internal bus;

an execution unit coupled to the internal bus;

an asynchronous receiver/transmitter coupled to the internal bus, comprising:

a baud divisor register for storing a baud divisor;

a plurality of baud divisor replacement registers for storing a plurality of baud divisor thresholds and a plurality of baud divisor replacements; and a baud divisor controller coupled to the plurality of
baud divisor replacement registers and the baud
divisor register for executing steps comprising:
determining the baud divisor, comprising the step of:
detecting the size of a start bit of a data stream
received by the asynchronous receiver/
transmitter;
comparing the baud divisor to the plurality of baud
divisor thresholds; and
selectively setting the baud divisor to a baud divisor
replacement of a baud divisor replacement register of
the plurality of baud divisor replacement registers
storing a baud divisor threshold based on a comparison between the baud divisor and the baud divisor
threshold.

24. The microcontroller of claim 23, the comparing step comprising the step of:
comparing the baud divisor to each baud divisor threshold of the plurality of baud divisor thresholds.

25. The microcontroller of claim 23, the comparing step comprising the step of:
comparing the baud divisor to each baud divisor threshold of the plurality of baud divisor thresholds until a predetermined mathematical condition relating the baud divisor and the baud divisor threshold is met.

26. The microcontroller of claim 23, the comparing step comprising of the step of:
determining if a predetermined mathematical condition relating the baud divisor and the baud divisor threshold is met.

27. The microcontroller of claim 23, wherein the plurality of baud thresholds and the plurality of baud divisor replacements are programmable.

28. The microcontroller of claim 23, the selectively setting step comprising the step of:
setting the baud divisor to a baud divisor replacement of a baud divisor replacement register if the baud divisor is less than or equal to a baud divisor threshold of the baud divisor replacement register.

29. The microcontroller of claim 23, wherein the baud divisor replacement corresponds to a high speed baud rate if a predetermined mathematical condition relating the baud divisor and the baud divisor threshold is met.

30. The microcontroller of claim 23, wherein the baud divisor replacement corresponds to a baud rate greater than approximately 57 k.

31. The microcontroller of claim 23,
wherein the selectively setting step occurs immediately following the start bit and before a next byte of data is received.

32. The microcontroller of claim 23, further comprising:
an autobaud clock generated from the baud divisor replacement.

33. The microcontroller of claim 23, the asynchronous receiver/transmitter having an autobaud mode for automatic baud detection with adjustment to a programmable baud rate, further comprising:
an autobaud mode bit for enabling the autobaud mode of the asynchronous receiver/transmitter.

* * * * *

UNITED STATES PATENT AND TRADEMARK OFFICE
CERTIFICATE OF CORRECTION

PATENT NO. : 6,366,610 B1
DATED : April 2, 2002
INVENTOR(S) : Bruce A. Loyer and Melanie D. Typaldos It is certified that error appears in the above-identified patent and that said Letters Patent is hereby corrected as shown below:

Column 3,
Line 53, please delete "205"

Signed and Sealed this

Eighteenth Day of February, 2003

JAMES E. ROGAN
*Director of the United States Patent and Trademark Office*